(12) United States Patent
Pandiyath et al.

(10) Patent No.: US 10,248,097 B2
(45) Date of Patent: Apr. 2, 2019

(54) METHOD AND APPARATUS FOR OPTIMIZING PROCESS CONTROL SYSTEMS

(71) Applicant: YOKOGAWA ELECTRIC CORPORATION, Musashino-shi, Tokyo (JP)

(72) Inventors: Bijuraj Velayudhan Pandiyath, Singapore (SG); Amit Ulhasrao Wadaskar, Singapore (SG); Joseph Ching Hua Lee, Singapore (SG)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 327 days.

(21) Appl. No.: 15/149,896

(22) Filed: May 9, 2016

(65) Prior Publication Data

US 2017/0322536 A1 Nov. 9, 2017

(51) Int. Cl.
*G05B 19/05* (2006.01)
*G05B 19/418* (2006.01)
*G06Q 10/06* (2012.01)

(52) U.S. Cl.
CPC ....... *G05B 19/05* (2013.01); *G05B 19/41875* (2013.01); *G06Q 10/06* (2013.01);
(Continued)

(58) Field of Classification Search
CPC .............. G05B 19/05; G05B 19/41875; G05B 2219/15105; G05B 2219/31449; G06Q 10/06
See application file for complete search history.

(56) References Cited

U.S. PATENT DOCUMENTS 8,676,812 B1 3/2014 Wu et al.
9,223,647 B2 12/2015 Schwartz et al.
(Continued)

FOREIGN PATENT DOCUMENTS

IN 1402/KOLNP/2014 A 8/2014
KR 101475921 B1 12/2014

OTHER PUBLICATIONS

Communication dated Nov. 20, 2017, issued by the European Patent Office in counterpart European application No. 17167495.5.
(Continued)

*Primary Examiner* — Yuhui R Pan
(74) *Attorney, Agent, or Firm* — Sughrue Mion, PLLC

(57) ABSTRACT

The invention provides methods, systems and computer programs for optimizing standard operating procedure for a control system. The invention comprises (i) recording a sequence of control system operator actions, (ii) identifying a control system process corresponding to the recorded sequence of control system operator actions, (iii) retrieving a standard operating procedure associated with the identified control system process, (iv) determining a first set of deviations between (a) the recorded sequence of control system operator actions and (b) the standard operating procedure, (v) determining a second set of deviations between (c) a set of KPI values associated with the recorded sequence of control system operator actions and (d) a set of KPI values associated with the standard operating procedure, and (vi) modifying the standard operating procedure to reduce deviation between (e) the recorded sequence of control system operator actions and (f) said standard operating procedure.

17 Claims, 7 Drawing Sheets

Figure 1:
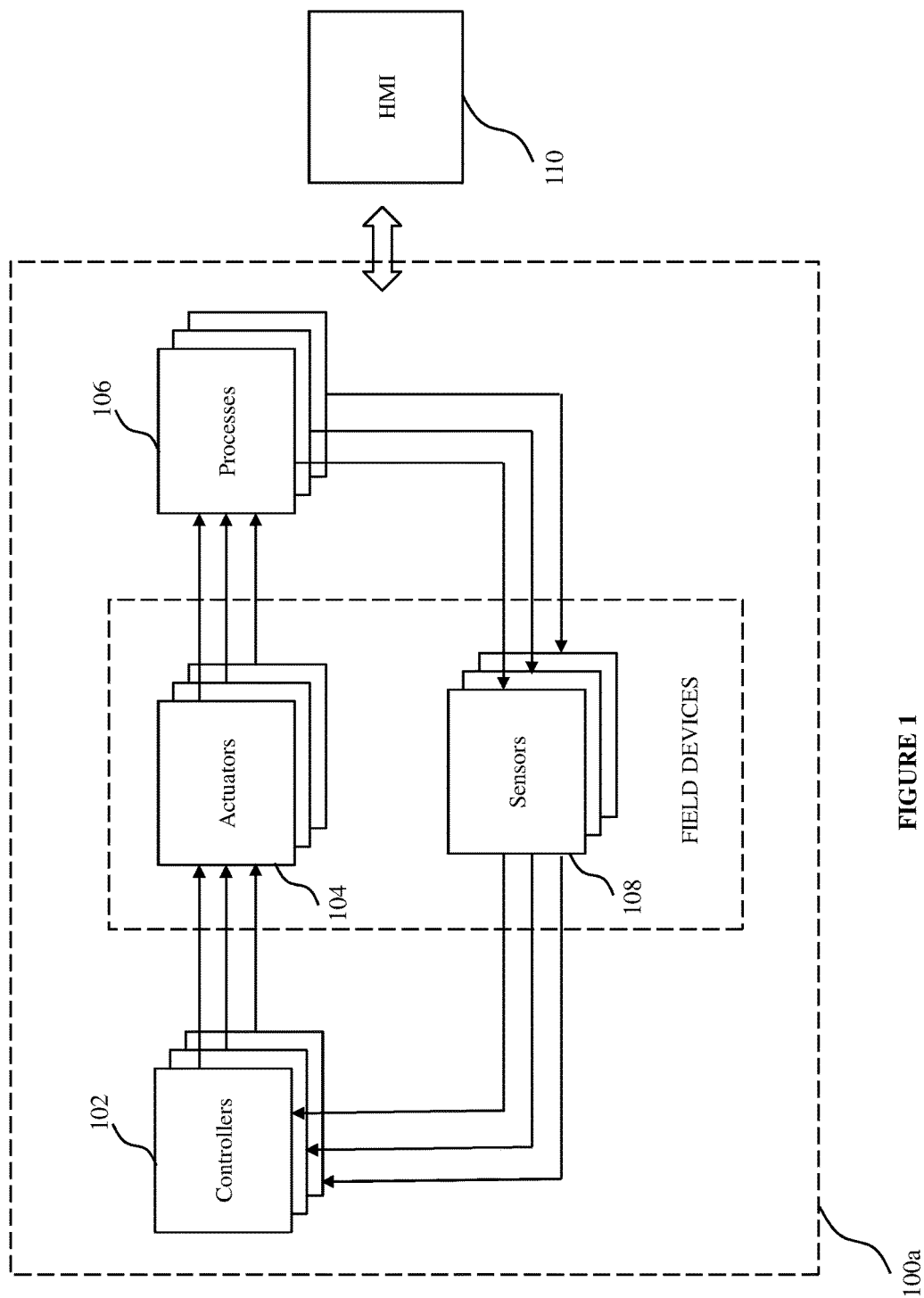

(52) U.S. Cl.
CPC ............. *G05B 2219/15105* (2013.01); *G05B 2219/31449* (2013.01); *Y02P 90/22* (2015.11)

(56) References Cited

U.S. PATENT DOCUMENTS

| | | |
|---|---|---|
| 9,286,026 B2 | 3/2016 | Liu et al. |
| 2014/0019215 A1 | 1/2014 | Jung et al. |
| 2015/0039657 A1 | 2/2015 | Roth et al. |
| 2015/0286203 A1 | 10/2015 | Stattelmann et al. |
| 2015/0312427 A1 | 10/2015 | Roulland et al. |
| 2015/0363518 A1* | 12/2015 | Edgington ............. G06Q 10/06 703/6 |
| 2016/0019091 A1 | 1/2016 | Leber et al. |
| 2017/0076239 A1* | 3/2017 | Rahul U .......... G06Q 10/06398 |

OTHER PUBLICATIONS

Min et al. "Business Process Performance Management Using Bayesian Belief Network", Proceedings of the 41st International Conference on Computers and Industrial Engineering, pp. 635-640 (6 pages total).

\* cited by examiner

METHOD AND APPARATUS FOR OPTIMIZING PROCESS CONTROL SYSTEMS

FIELD OF THE INVENTION

The invention relates to the field of control systems including industrial or other process control systems. In particular, the invention enables optimization of standard operating procedures within control systems in a plant or industry.

BACKGROUND

Control system engineering refers to a domain of engineering that deals with architectures, mechanisms and algorithms for maintaining output of a specific system or process within a desired range. Automated control systems are used extensively in industry and for example can be achieved using programmable logic controllers (PLC(s)), or in the case of more complex systems using distributed control systems (DCS) or supervisory control and data acquisition systems (SCADA).

Automated control systems rely on one or more controllers communicatively coupled to one or more field devices. Field devices (e.g. sensors, valves, switches, receivers and transmitters) are located within the process environment corresponding to the control system (for example, but not limited to, an industrial plant or system) and may be configured to perform physical or process control functions to control one or more components, processes or variables under observation within the process environment. Process controllers may be located within the process environment and are configured to receive signals from field devices, make control decisions, generate control signals and communicate with field devices.

Operation of control systems rely on a set of standard operating procedure(s) (SOP(s))—which prescribe one or more methods (i.e. sequence of steps and/or operator actions) for operating the control systems, and which one or more methods are considered optimal for achieving a desired process state or process outcome. Control systems operators are trained to implement standard operating procedures corresponding to the respective control systems processes that they are designated to operate.

Prior art systems implement various mechanisms to determine whether operators are complying with defined standard operating procedures—and to raise alerts or alarms in case of deviations from standard operating procedures. These prior art systems have been found to be disadvantageous as they operate on the assumptions that (i) a defined standard operating procedure is incapable of (or does not require) improvement and (ii) that any deviation from the defined standard operating procedure (including deviations which could potentially result in output or state optimization) is indicative of an error. These assumptions prevent operators from improving or optimizing existing standard operating procedures.

Additionally, with the passage of time and variations in plant conditions, there may be a need to deviate from a defined standard operating procedure to improve or maintain output conditions. There is accordingly a need for a solution that enables monitoring of operator compliance with defined standard operating procedures, and which further enables identification and adoption of improvements over an earlier defined standard operating procedure.

SUMMARY

The invention provides methods, systems and computer programs for optimizing standard operating procedure for a control system.

In a first embodiment, the invention is a method for optimizing standard operating procedures for a control system. The method comprises (i) recording a sequence of control system operator actions, wherein one or more operator actions within the recorded sequence of control system operator actions are detected based on at least one operator input received at a processor implemented operator interface, (ii) identifying a control system process corresponding to the recorded sequence of control system operator actions, (iii) determining a set of key performance indicator values (KPI values) associated with the recorded sequence of control system operator actions, wherein one or more values within the determined set of KPI values are determined based on state changes detected at one or more control system sensors, (iv) retrieving a standard operating procedure associated with the identified control system process, wherein said standard operating procedure defines a sequence of control system operator actions, (v) retrieving a set of KPI values associated with the standard operating procedure, (vi) determining a first set of deviations between (a) the recorded sequence of control system operator actions and (b) the sequence of control system operator actions defined by the standard operating procedure, (vii) determining a second set of deviations between (c) the set of KPI values associated with the recorded sequence of control system operator actions and (d) the set of KPI values associated with the standard operating procedure, and responsive to one or both of the first set of deviations and second set of deviations conforming to a predefined modification criteria, modifying the standard operating procedure to reduce deviation between (e) the recorded sequence of control system operator actions and (f) control system operator actions defined by said standard operating procedure.

In an embodiment, modifying the standard operating procedure may comprise replacing said standard operating procedure with the recorded sequence of control system operator actions.

In a further embodiment, modifying the standard operating procedure comprises one of (i) adding to the control system operator actions defined by said standard operating procedure, at least one control system operator action that is included within the recorded sequence of control system operator actions, or (ii) removing from the control system operator actions defined by said standard operating procedure, at least one control system operator action that is excluded from the recorded sequence of control system operator actions.

Determining conformity with the predefined modification criteria may comprise determining one or more of (i) existence of one or more differences between (f) the recorded sequence of control system operator actions and (g) the sequence of control system operator actions defined by the standard operating procedure, and (ii) existence of one or more differences between (c) the set of KPI values associated with the recorded sequence of control system operator actions and (d) the set of KPI values associated with the standard operating procedure.

In an exemplary embodiment, the data record corresponding to the standard operating procedure is modified responsive to a determination that (h) the sequence of recorded control system operator actions eliminates one or more control system operator actions defined by the standard operating procedure, and (i) a comparison between (1) the set of KPI values associated with the recorded sequence of control system operator actions, and (2) the set of KPI values associated with the standard operating procedure, establishes substantial equivalence between the compared KPI values. In another exemplary embodiment, the data record corresponding to the standard operating procedure is modified responsive to a determination that (j) the sequence of recorded control system operator actions implements one or more control system operator actions that are not included within the standard operating procedure, and (k) the set of KPI values associated with the recorded sequence of control system operator actions is closer to a target set of KPI values than the set of KPI values associated with the standard operating procedure.

The method may further comprise communicating an operator alert to the processor implemented operator interface, wherein the operator alert is generated responsive to a determination that one or both of the first set of deviations and second set of deviations conform to the predefined modification criteria.

The recorded sequence of control system operator actions may be selected from among a plurality of recorded sequences of control system operator actions associated with the control system process. The plurality of recorded sequences of control system operator actions may be ranked relative to each other, wherein rankings of each of the plurality of recorded sequences of control system operator actions are based on a defined ranking criteria. Selection of the recorded sequence of control system operator actions from among the plurality of recorded sequences of control system operator actions associated with the control system process may comprises (i) displaying rankings of each of the plurality of recorded sequences of control system operator actions at the processor implemented operator interface, and (ii) receiving at the processor implemented operator interface, at least one operator input identifying a recorded sequence of control system operator actions for selection.

In a second embodiment the invention may comprise a system for optimizing standard operating procedures for a control system comprising one or more processors, sensors or actuators. The system may comprise a processor implemented operator interface, a control system process monitor, a key performance indicator monitor, and a performance analyser.

The control system process monitor may be configured to (i) record a sequence of control system operator actions, wherein one or more operator actions within the recorded sequence of control system operator actions are detected based on at least one operator input received at the processor implemented operator interface, (ii) identify a control system process corresponding to the recorded sequence of control system operator actions, and (iii) retrieve a standard operating procedure associated with the identified control system process, wherein said standard operating procedure defines a sequence of control system operator actions.

The key performance indicator monitor may be configured to (i) determine a set of key performance indicator values (KPI values) associated with the recorded sequence of control system operator actions, wherein one or more values within the determined set of KPI values are determined based on state changes detected at one or more control system sensors, and (ii) retrieve a set of KPI values associated with the standard operating procedure.

The performance analyser may be configured to (i) determine a first set of deviations between (a) the recorded sequence of control system operator actions and (b) the sequence of control system operator actions defined by the standard operating procedure, (ii) determine a second set of deviations between (c) the set of KPI values associated with the recorded sequence of control system operator actions and (d) the set of KPI values associated with the standard operating procedure, and (iii) responsive to one or both of the first set of deviations and second set of deviations conforming to a predefined modification criteria, modifying the standard operating procedure to reduce deviation between (e) the recorded sequence of control system operator actions and (f) control system operator actions defined by said standard operating procedure.

In an embodiment of the system, modifying the standard operating procedure may comprise replacing said standard operating procedure with the recorded sequence of control system operator actions.

In another embodiment, modifying the standard operating procedure may comprise one of (i) adding to the control system operator actions defined by said standard operating procedure, at least one control system operator action that is included within the recorded sequence of control system operator actions, or (ii) removing from the control system operator actions defined by said standard operating procedure, at least one control system operator action that is excluded from the recorded sequence of control system operator actions.

In a further embodiment, determining conformity with the predefined modification criteria may comprise determining one or more of (i) existence of one or more differences between (f) the recorded sequence of control system operator actions and (g) the sequence of control system operator actions defined by the standard operating procedure, and (ii) existence of one or more differences between (c) the set of KPI values associated with the recorded sequence of control system operator actions and (d) the set of KPI values associated with the standard operating procedure.

In a system embodiment, the data record corresponding to the standard operating procedure is modified responsive to a determination that (h) the sequence of recorded control system operator actions eliminates one or more control system operator actions defined by the standard operating procedure, and (i) a comparison between (1) the set of KPI values associated with the recorded sequence of control system operator actions, and (2) the set of KPI values associated with the standard operating procedure, establishes substantial equivalence between the compared KPI values.

In another system embodiment, the data record corresponding to the standard operating procedure is modified responsive to a determination that (j) the sequence of recorded control system operator actions implements one or more control system operator actions that are not included within the standard operating procedure, and (k) the set of KPI values associated with the recorded sequence of control system operator actions is closer to a target set of KPI values than the set of KPI values associated with the standard operating procedure.

The performance analyser may be configured to communicate an operator alert to the processor implemented operator interface, wherein the operator alert is generated responsive to a determination that one or both of the first set of deviations and second set of deviations conform to the predefined modification criteria.

The recorded sequence of control system operator actions may be selected from among a plurality of recorded sequences of control system operator actions associated with the control system process.

The performance analyser may be configured to rank the plurality of recorded sequences of control system operator actions relative to each other, and wherein rankings of each of the plurality of recorded sequences of control system operator actions are based on a defined ranking criteria.

In a system embodiment of the invention, selection of the recorded sequence of control system operator actions from among the plurality of recorded sequences of control system operator actions associated with the control system process may comprise (i) displaying rankings of each of the plurality of recorded sequences of control system operator actions at the processor implemented operator interface, and (ii) receiving at the processor implemented operator interface, at least one operator input identifying a recorded sequence of control system operator actions for selection.

In a third embodiment the invention comprises a computer program product for optimizing standard operating procedures for a control system, comprising a non-transitory computer usable medium having a computer readable program code embodied therein. The computer readable program code may comprise instructions for (i) recording a sequence of control system operator actions, wherein one or more operator actions within the recorded sequence of control system operator actions are detected based on at least one operator input received at a processor implemented operator interface, (ii) identifying a control system process corresponding to the recorded sequence of control system operator actions, (iii) determining a set of key performance indicator values (KPI values) associated with the recorded sequence of control system operator actions, wherein one or more values within the determined set of KPI values are determined based on state changes detected at one or more control system sensors, (iv) retrieving a standard operating procedure associated with the identified control system process, wherein said standard operating procedure defines a sequence of control system operator actions, (v) retrieving a set of KPI values associated with the standard operating procedure, (vi) determining a first set of deviations between (a) the recorded sequence of control system operator actions and (b) the sequence of control system operator actions defined by the standard operating procedure, (vii) determining a second set of deviations between (c) the set of KPI values associated with the recorded sequence of control system operator actions and (d) the set of KPI values associated with the standard operating procedure; and (viii) responsive to one or both of the first set of deviations and second set of deviations conforming to a predefined modification criteria, modifying the standard operating procedure to reduce deviation between (e) the recorded sequence of control system operator actions and (f) control system operator actions defined by said standard operating procedure.

BRIEF DESCRIPTION OF THE ACCOMPANYING DRAWINGS

Figure 2:
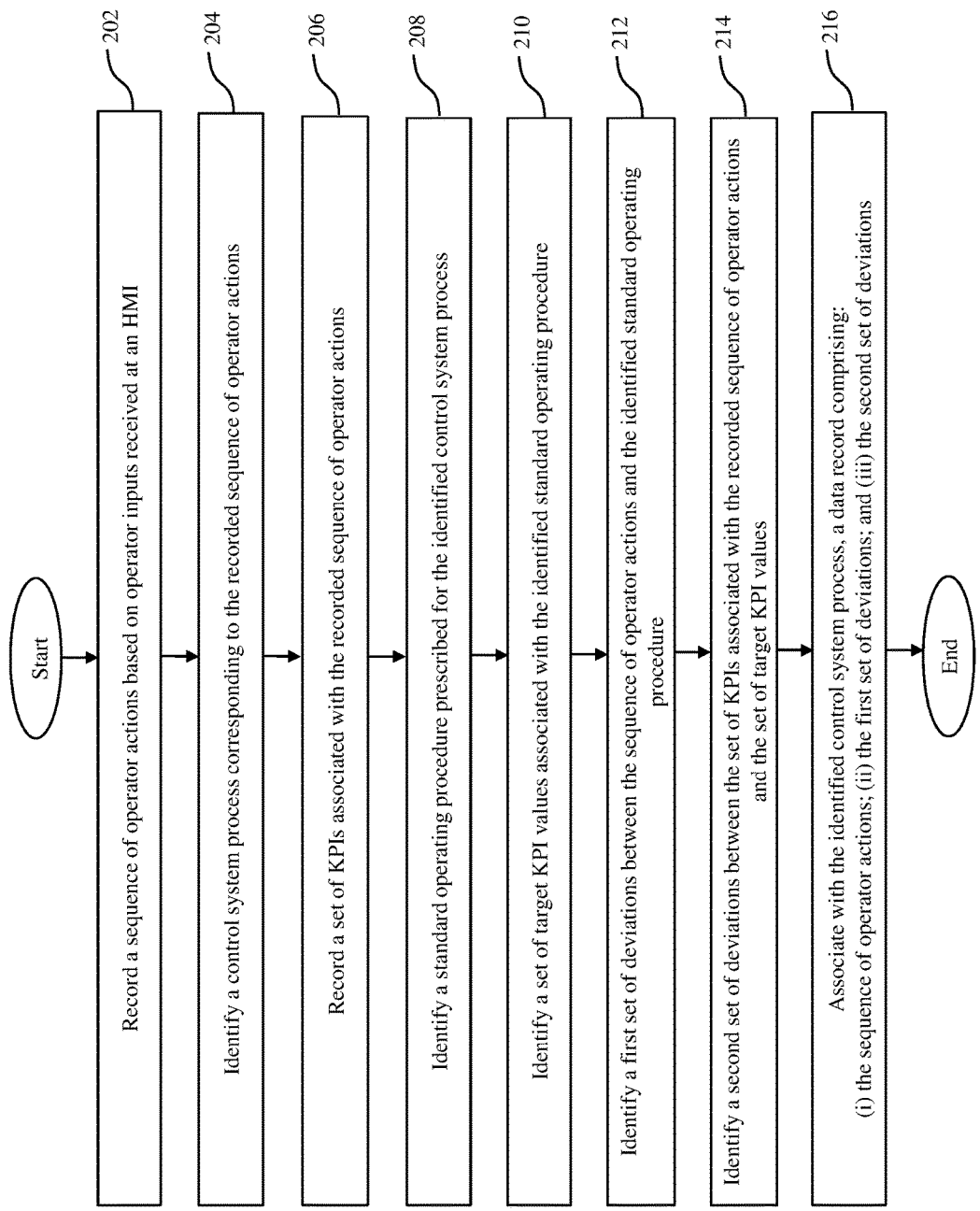
Figure 3:
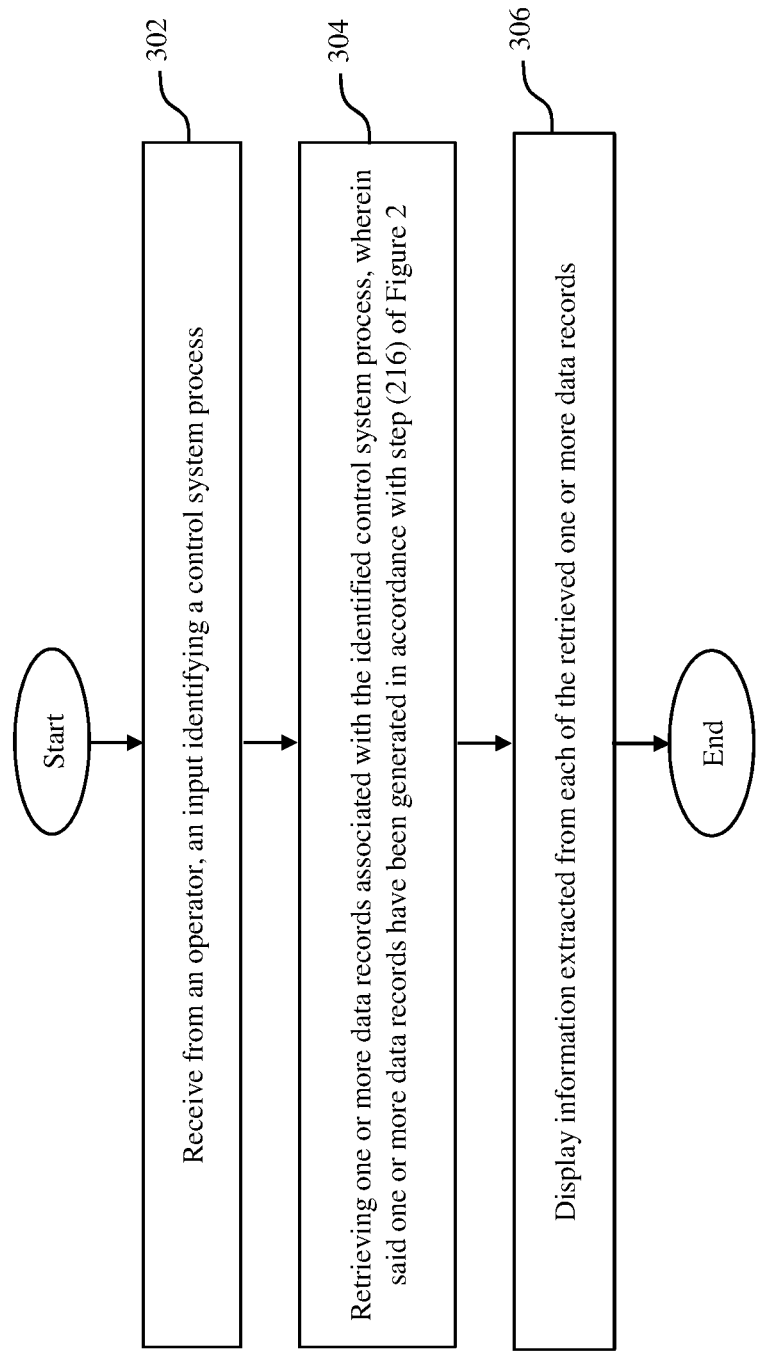
Figure 4:
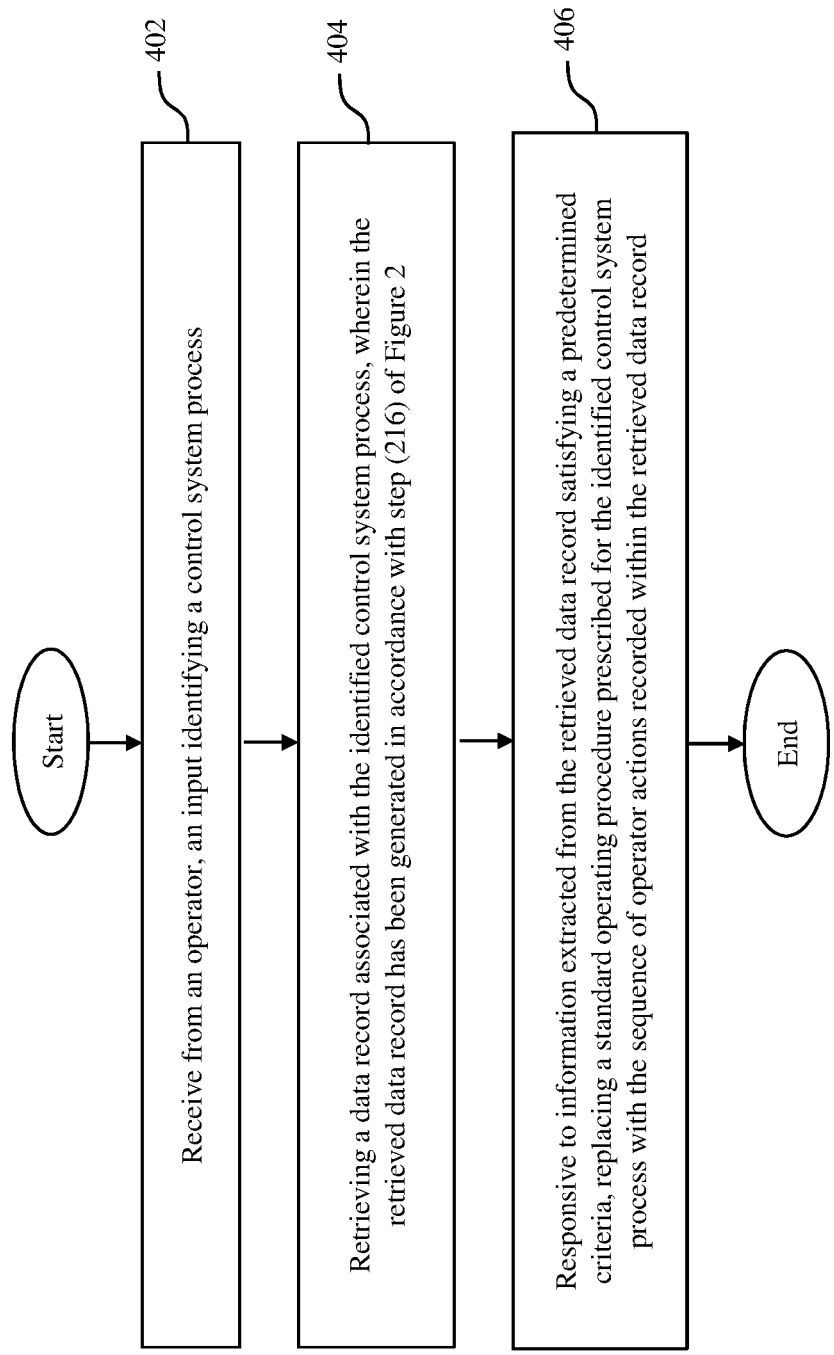
Figure 5:
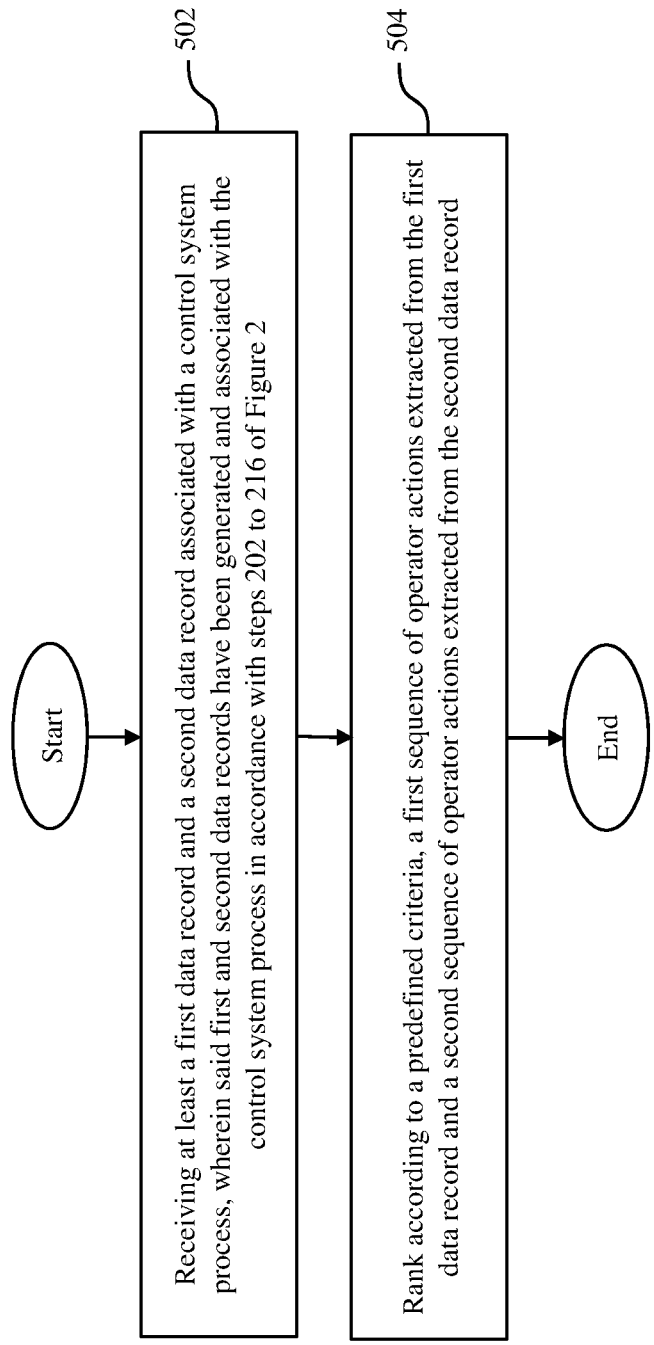
Figure 6:
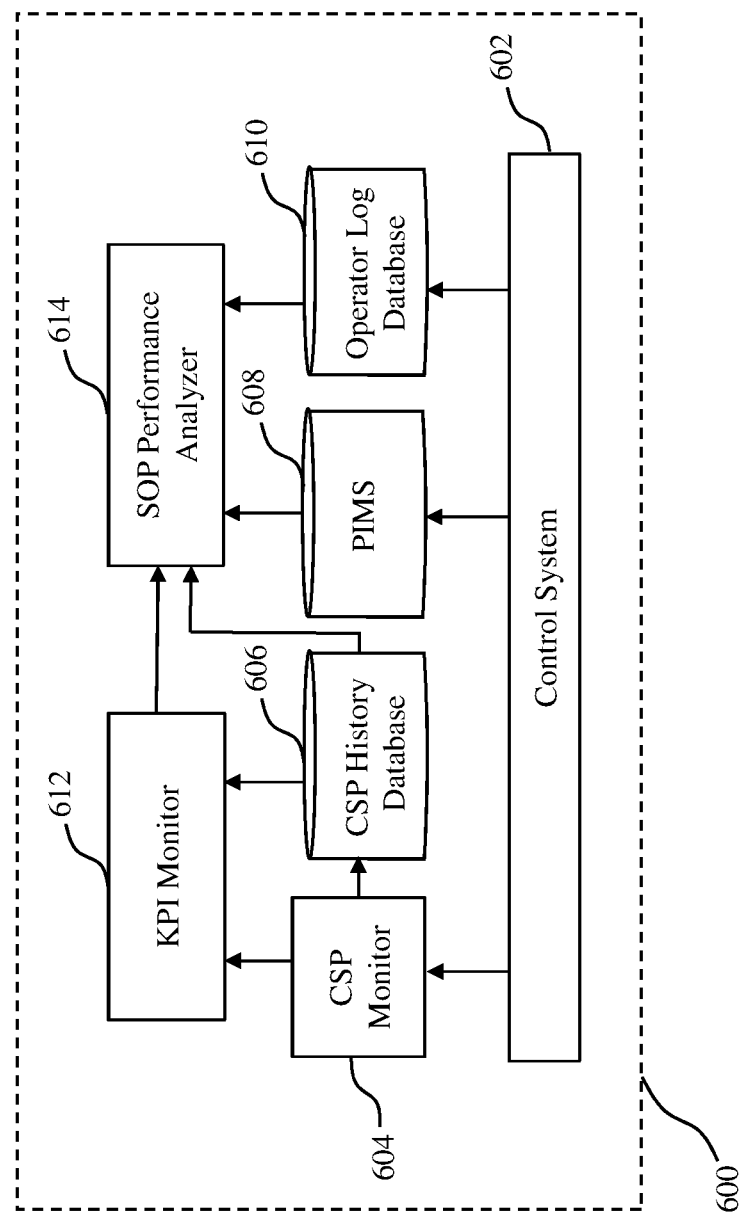
Figure 7:
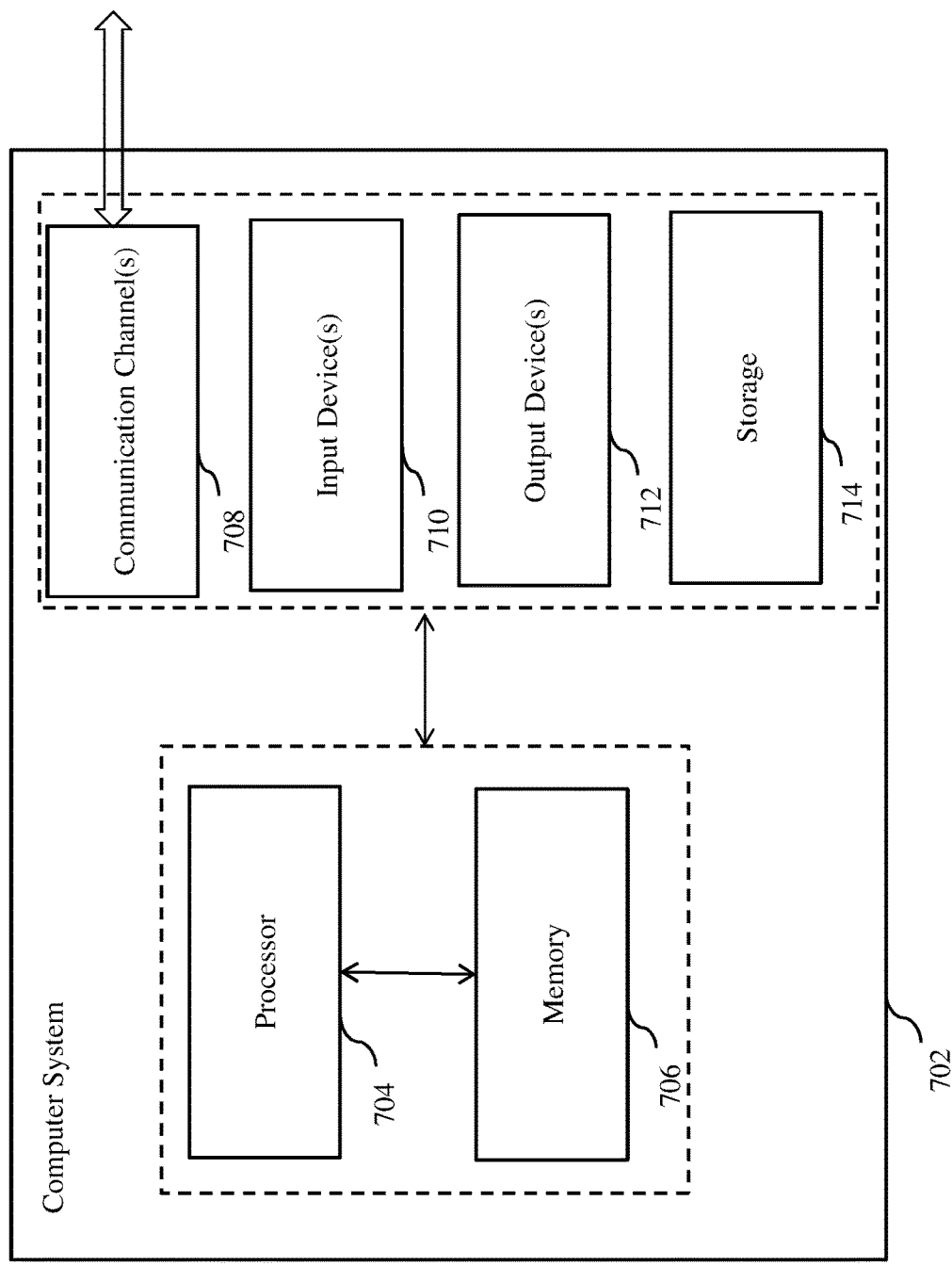

FIG. 1 illustrates a process control system.
FIG. 2 illustrates a method for generating data records in accordance with the present invention.
FIG. 3 illustrates a method for retrieving data records and displaying information extracted from such data records.
FIG. 4 illustrates a method of optimizing a standard operating procedure associated with a control system process
FIG. 5 illustrates an exemplary method for selection of a data record from among multiple data records.
FIG. 6 illustrates an exemplary process environment configured to implement the methods of the present invention.
FIG. 7 illustrates an exemplary computing system in which various embodiments of the invention may be implemented.

DETAILED DESCRIPTION

The present invention provides methods, systems and computer program products for optimization of standard operating procedures associated with a process control system. The invention is premised on an understanding that, in implementing control system processes, operators may from time to time deviate from standard operating procedures—and that such deviations may in fact comprise advancements or improvements over the prescribed standard operating procedures. The invention seeks to optimize existing standard operating procedures by replacing/modifying said standard operating procedures with improvements discovered or introduced by operators.

The invention seeks to optimize existing standard operating procedures by (i) identifying operator induced deviations from predefined standard operating procedures, (ii) correlating the identified deviations with detectable improvements or deteriorations in parameter values corresponding to key performance indicators (KPIs), and (iii) modifying standard operating procedures by introducing deviations that have been correlated with detectable improvements in parameter values corresponding to KPIs—and which can therefore legitimately be expected to improve functionality or outcomes of the control system.

FIG. 1 illustrates a process control system 100. The process control system includes a plurality of controllers 102 and a plurality of field devices, such as for example actuators 104 and sensors 108. Controllers 102 control processes 106 through field devices within the process control system. By way of example, sensors 108 may communicate feedback to controllers 102 regarding states of one or more processes 106. Based on received feedback, controllers 102 may generate control signals and communicate them to actuators 104 to control processes under execution. The control system 100 and one or more of the controllers, field devices and processes may be configured to communicate with a Human-Machine-Interface (HMI) 110. The Human-Machine-Interface may in an embodiment comprise an operator terminal or a computer terminal configured to receive operator inputs for generating control instructions to the control system and may also be configured to display information regarding status of or outputs from the control system.

For the purposes of the present invention, the term "control system process" shall mean a process being implemented by or within a control system.

For the purposes of the present invention, the term "KPI parameter(s)" shall be understood as referring to one or more parameters whose determinable values may be used as key performance indicators (KPIs).

For the purposes of the present invention, the term "key performance indicator(s)" or "KPI(s)" or "KPI values" may used interchangeably and are to be understood as referring to one or more values that are indicative of (i) efficiency of a control system, (ii) performance of a control system process or (iii) performance of a control system operator.

Exemplary KPIs and KPI parameters may include one or more of:

- Parameters values or ranges of parameter values corresponding to one or more system parameters that are monitored by field devices within a control system.
- Parameter value trends (i.e. a progression of parameter values over a period of time or over the duration of execution of a control system process) corresponding to one or more system parameters that are monitored by field devices within a control system.
- Average duration for completing all steps prescribed within a standard operating procedure.
- Minimum duration for completing all steps prescribed within a standard operating procedure.
- Identification of an operator responsible for shortest completion time associated with a standard operating procedure.
- Start time of the fastest implemented iteration of a standard operating procedure.
- Maximum duration required to complete all steps prescribed within a standard operating procedure.
- Identification of an operator responsible for the longest completion time associated with a standard operating procedure.
- Start time of the slowest implemented iteration of a standard operating procedure.
- Maximum number of steps skipped by any operator during execution of a standard operating procedure.
- Average number of steps skipped by operators during multiple iterations of a standard operating procedure.
- Minimum number of steps skipped by any operator during execution of a standard operating procedure.
- Identification of an operator responsible for skipping a maximum number of steps associated with a standard operating procedure.
- Identification of an operator responsible for skipping a minimum number of steps associated with a standard operating procedure.
- Maximum number of steps added during execution of a standard operating procedure.
- Average number of steps added during execution of a standard operating procedure.
- Minimum number of steps added during execution of a standard operating procedure.
- Identification of operator responsible for adding a maximum number of steps associated with a standard operating procedure.
- Identification of operator responsible for adding minimum number of steps to a standard operating procedure.

FIG. 2 illustrates a method embodiment of the present invention.

Step 202 comprises recording a sequence of operator actions based on operator inputs received at a Human-Machine-Interface. For the purposes of the invention it would be understood that operator actions consist of operator inputs, operator instructions or operator interventions received by a control system either at a Human-Machine-Interface or alternatively at a field device within the control system. The sequence of recorded operator actions may comprise one or more operator actions. Step 202 may additionally comprise recording one or more of (i) information identifying the responsible operator (such as an operator name or operator id), (ii) start time of the sequence of operator actions, (iii) end time of the sequence of operator actions and (iv) time of receipt or time of execution of one or more actions within the sequence of operator actions.

Step 204 comprises identifying (from among a plurality of control system processes associated with the control system), a control system process that corresponds to the recorded sequence of operator actions. Stated differently, step 204 identifies a control system process that the operator is initiating, implementing, executing or controlling by the recorded sequence of operator actions. This step may be implemented in a number of different ways, including by relying on one or more of (i) system information identifying a control system process that the recorded sequence of operator actions corresponds to, (ii) identifying control system processes that the concerned operator is authorized to execute (iii) identifying a control system process that includes one or more steps implemented by the recorded sequence of operator actions or (iv) any other method that would be apparent to the skilled person in view of the control system under consideration.

Step 206 comprises recording a set of KPI values associated with the recorded sequence of operator actions. The set of KPI parameters selected for the purposes of step 206 may comprise any KPI parameters considered to be relevant for evaluating state, performance, effectiveness or outcomes of the recorded sequence of operator actions, and in an embodiment may comprise one or more of the KPI parameters listed above. In an embodiment of the invention, one or more of the KPI values associated with the recorded sequence of operator actions is determined, measured and/or recorded based on state changes detected at one or more sensors, actuators or other field devices associated with the control system.

Step 208 comprises identifying a standard operating procedure that has been prescribed or defined in respect of the control system process identified at step 204. Standard operating procedures and their association with control system processes may be stored in one or more databases or data repositories associated with the control system. The identification at step 208 may, in an embodiment, be achieved by accessing information retrieved from such databases or data repositories.

Step 210 comprises identifying a set of KPI values associated with the standard operating procedure that has been identified at step 208. In an embodiment of the invention, KPI parameters identified at step 210 may correspond to the KPI parameters of the set of KPI values recorded at step 206. The set of KPI values associated with each standard operating procedure associated with a control system may be stored in and retrieved from one or more databases or data repositories.

Step 212 comprises identifying a first set of differences or deviations, comprising differences/deviations between the sequence of operator actions recorded at step 202 and the steps within the identified standard operating procedure identified at step 208. It would be understood that the differences or deviations may comprise either or both of (i) steps that are included within the standard operating procedure but which have been missed or eliminated by the operator in the recorded sequence of operator actions and (ii) steps that are not included within the standard operating procedure but which have been implemented by the operator in the recorded sequence of operator actions.

Step 214 comprises identifying a second set of differences or deviations, comprising differences/deviations between the set of KPI values recorded at step 206 (i.e. the set of KPI values associated with the recorded sequence of operator actions) and the set of KPI values identified at step 210. It would be understood that step 214 comprises comparing the set of KPI values recorded at step 206 and the set of KPI values (or range of values for KPI parameters) associated with the standard operating procedure, to determine whether the measured KPI values are consistent with the KPI values associated with the standard operating procedure. In an embodiment of the invention at least one of the differences between the set of KPI values recorded at step 206 and the set of KPI values identified at step 210—is determined based on KPI data recorded at one or more sensors, actuators or other field devices associated with the control system.

Step 216 thereafter comprises generating a data record and associating said data record with the control system process identified at step 204—wherein the generated data record comprises one or more of (i) the recorded sequence of operator actions from step 202 (ii) KPI values associated with the recorded sequence of operator actions (iii) a standard operating procedure associated with the control system process identified at step 204 (iv) a predefined set of KPI values (or predefined range of KPI values) associated with said standard operating procedure (v) the first set of deviations determined at step 212 and (vi) the second set of deviations determined at step 214.

It would be understood from the above that following the steps of FIG. 2 results in a data record corresponding to a sequence of operator actions associated with a specific control system process, which data record simultaneously records operator deviations from a prescribed standard operating procedure (i.e. the first set of deviations), and the effect of such deviations on KPI values associated with the standard operating procedure (i.e. the second set of deviations).

The data records generated by the method of FIG. 2 and the information within such data records can be used to enable optimization of standard operating procedures associated with the control system, in accordance with the methods described below.

FIG. 3 illustrates a method by which an operator, system administrator or user can retrieve and display information extracted from data records (generated in accordance with the teachings of FIG. 2) associated with a control system process.

Step 302 comprises receiving from an operator, an input identifying a control system process. The operator input may be received from an HMI associated with the control system.

Step 304 comprises retrieving one or more data records associated with the identified control system process. The data records retrieved at step 304 may comprise data records generated in accordance with step 216 of FIG. 2. In an embodiment of the invention, step 304 may comprise retrieving all data records having an association with the identified control system process. In another embodiment of the invention, step 304 may comprise selecting and retrieving one or more data records from a set of data records associated with the identified control system process—wherein selection of the one or more data records is in accordance with one or more predetermined selection criteria. In an embodiment of step 304, selection in accordance with a predetermined selection criteria may comprise selection of one or more associated data records based on a ranking associated with each of the data records (for example, ranking in accordance with the method described hereinafter in connection with FIG. 5).

Step 306 comprises displaying at a HMI, information extracted from each of the one or more data records retrieved at step 304. The information extracted from each of the one or more data records and displayed at step 306 may include one or more of (i) the recorded sequence of operator actions of step 202 of FIG. 2(ii) KPI values associated with the recorded sequence of operator actions of FIG. 2 (iii) a standard operating procedure associated with the control system process identified at step 204 of FIG. 2 (iv) a set of KPI values (or predefined range of KPI values) associated with said standard operating procedure (v) the first set of deviations determined at step 212 of FIG. 2 (vi) the second set of deviations determined at step 214 of FIG. 2 and /or (vii) a total number of determined deviations (or significant deviations) between KPI values associated with the recorded sequence of operator actions and a set of KPI values (or predefined range of KPI values) associated with the standard operating procedure.

In an embodiment of the invention, the method of FIG. 3 may additionally include receiving through the HMI, one or more operator inputs, responsive to which operator inputs the method may additionally cause (i) display of one or more KPI trends associated with a control system process (i.e. display of the progression of one or more KPI values responsive to changes in a defined variable, such as time) or (ii) display of operator logs associated with one or more operators that have access to or are responsible for implementing the concerned control system process.

Displaying information extracted from data records (that are generated in accordance with step 216 of FIG. 2) at a HMI, enables an operator to review one or more sets of data records that provide information regarding (i) operator induced deviations from standard operating procedures associated with a control system process and (ii) the impact of such operator induced deviations on KPI parameters. By assessing the impact of operator induced deviations on KPI parameters, it is possible to ascertain whether the operator induced deviations from a standard operating procedure improve or optimize the standard operating procedure.

FIG. 4 illustrates an exemplary method of optimizing a standard operating procedure(s) associated with a control system process.

Step 402 comprises receiving from an operator, an operator input identifying a control system process associated with a control system. The operator input may be received at a HMI associated with the control system.

Step 404 comprises retrieving a data record associated with the identified control system process. The retrieved data record may in an embodiment, have been generated in accordance with the teachings of step 202 to 216 of FIG. 2.

Step 406 comprises replacing a standard operating procedure associated with the control system process (as identified at step 402) with a sequence of operator actions recorded within the data record retrieved at step 404, provided the information within such data record satisfies one or more predetermined criteria. Replacement of the standard operating procedure may involve storing (or otherwise persisting) of the sequence of operator actions recorded within the data record retrieved at step 404 in a repository or database.

In a specific embodiment, responsive to a determination that information within the data record satisfies one or more predetermined criteria, the invention may comprise additional intermediate steps of (i) generating and displaying (or otherwise communicating by any other means) to an operator, an alarm or alert confirming that the predetermined criteria has been met and (ii) receiving an operator input through a HMI, responsive to which operator input the method proceeds to step 406.

In an embodiment of step 406, the standard operating procedure associated with the control system process is replaced with a sequence of operator actions recorded within the data record identified or retrieved at step 402, provided:

the sequence of operator actions recorded within the data record is different from the sequence of steps or operator actions within the standard operating procedure; and one or more of the KPI values corresponding to the sequence of operator actions are different from one or more KPI values within the set of KPI values associated with the standard operating procedure.

In another embodiment of step 406, the standard operating procedure prescribed for the control system process (identified at step 402) is replaced with a sequence of operator actions recorded within a data record (identified at step 402), provided:

the sequence of operator actions recorded within the data record eliminates one or more steps from the sequence of steps or operator actions within the standard operating procedure; and a comparison between (i) the set of KPI values associated with the recorded sequence of operator actions, and (ii) the set of KPI values associated with the standard operating procedure, establishes equivalence or substantial equivalence between the compared KPI values.

In yet another embodiment of step 406, the standard operating procedure prescribed for the control system process (identified at step 402) is replaced with the sequence of operator actions recorded within the data record retrieved at step 404, provided:

the sequence of operator actions recorded within the data record is different from the sequence of steps or operator actions within the standard operating procedure; and evaluation (in accordance with any predetermined criteria) of one or more differences or deviations between (i) the set of KPI values associated with the recorded sequence of operator actions, and (ii) the set of KPI values associated with the standard operating procedure, establishes an improvement in performance of the control system process arising out of the recorded sequence of operator actions. In an embodiment of the invention, a determination that the recorded sequence of operator actions comprises an improvement in performance over the sequence of operator actions prescribed by the standard operating procedure may be arrived at if the set of KPI values associated with the recorded sequence of operator actions is closer to a target set of KPI values than the set of KPI values associated with the retrieved standard operating procedure.

Exemplary non-limiting methods and/or criteria for assessing whether any such improvement has occurred, include ascertaining whether (i) the KPI values associated with the recorded sequence of operator actions are closer to a prescribed/ideal range of values for KPI parameters under consideration, in comparison with values/average values for KPI values associated with the standard operating procedure (ii) the average/minimum/maximum duration for completing the recorded sequence of operator actions is less than the average/minimum/maximum duration for completing the standard operating procedure, and (iii) the number of steps in the recorded sequence of operator actions is less than the number of steps in the standard operating procedure.

In an embodiment of step 406 of FIG. 4, the standard operating procedure prescribed for the control system process (identified at step 402) is not replaced with the entire sequence of operator actions recorded within the data record retrieved at step 404—and instead is modified partially to either include at least one additional step from the recorded sequence of operator actions, or to eliminate at least one step that is not included within the recorded sequence of operator actions.

In an alternative embodiment of the method disclosed in FIG. 4, an alarm or alert may be generated, and displayed or communicated by any means to an operator, provided:

(i) the sequence of operator actions recorded within the data record is different the sequence of steps or operator actions within the standard operating procedure; and (ii) one or more differences or deviations between (a) the set of KPI values associated with the recorded sequence of operator actions, and (b) the set of KPI values associated with the standard operating procedure, satisfy one or more predetermined criteria that is indicative of a decline in performance; or (iii) the sequence of operator actions recorded within the data record includes certain additional steps or operator actions that are not included within the standard operating procedure; and (iv) a comparison between (c) the set of KPI values associated with the recorded sequence of operator actions and (d) the set of KPI values associated with the standard operating procedure establishes equivalence or substantial equivalence between the compared sets of KPI values.

Responsive to display or communication of an alert or alarm of the type described in the immediately preceding paragraphs, the operator(s) responsible for causing the sequence of steps or operator actions to deviate from the standard operating procedure may be retrained in the standard operating procedure(s).

In a further embodiment of the invention, any of the alerts or alarms discussed in connection with embodiments of FIG. 4 may also be displayed or communicated to a system administrator or evaluator of standard operating procedures. Communicating such alerts or alarms enables identification or recording or "hot points" (i.e. KPI deviations of significant magnitude or KPI values that are most significantly impacted by deviation(s) from standard operating procedures).

In an embodiment of the method discussed in connection with FIG. 4, the data record used at step 406 for extracting a sequence of operator actions which is subsequently used to replace or modify a standard operating procedure, is a data record that has been selected from among several data records associated with a control system process. FIG. 5 illustrates an exemplary method that facilitates this process of selection among multiple data records.

Step 502 of FIG. 5 comprises receiving at least a first data record and a second data record associated with a control system process. In an embodiment of the method, the at least first and second data records have been generated and associated with the control system process (i.e. a control system process that is under consideration) in accordance with steps 202 to 216 of FIG. 2. In an embodiment of the invention, the at least first and second data records may be retrieved from a database or repository of data records associated with said control system process.

Step 504 comprises extracting sequences of operator actions that are respectively recorded within the at least first and second data records, and ranking each extracted sequence of operator actions relative to all the other extracted sequences of operator actions. Stated differently, step 504 comprises generating a relative ranking for each sequence of operator actions extracted from the data records received at step 502. The ranking of each extracted sequence of operator actions may be in accordance with one or more predetermined criteria for ranking.

Exemplary non-limiting predetermined criteria for ranking sequences of operator actions at step 504 include (i) total number of determinable deviations between a plurality of KPI values associated with an extracted sequence of operator actions and a prescribed/ideal range of values for KPI parameters under consideration, (ii) magnitude of differences between one or more KPI values associated with an extracted sequence of operator actions and a prescribed/ideal range of values for KPI parameters under consideration, (iii) the average/minimum/maximum duration for completing the extracted sequence of operator actions and/or (iv) the number of steps in the recorded sequence of operator actions.

It would be understood that ranking various sequences of operator actions associated with a control process system in accordance with a predetermined criteria enables an assessment and comparison between the various alternative sequences of operator actions—and also enables a determination regarding which of the various alternative sequences of operator actions are optimal in view of said predetermined criteria. As discussed above, such rankings may be used to select data records for presentation to an operator (for example in an embodiment of step 304 of FIG. 3) or for replacing or modifying a standard operating procedure (for example in an embodiment of step 406 of FIG. 4). For example, (i) in an embodiment of the method described in connection with FIG. 3, an operator may be presented with a display consisting of the top n ranked data records, or (ii) in an embodiment of the method described in connection with FIG. 4, a standard operating procedure associated with a control system process may be replaced or modified based on a highest ranked sequence of operator actions from among n ranked sequences of operator actions that have been ranked in accordance with the method steps of FIG. 5.

FIG. 6 illustrates an exemplary process environment 600 configured to implement the methods of the present invention. Control system 602 is communicably coupled with Plant Information Management System (PIMS) 608, and additionally with Control System Process (CSP) Monitor 604, Standard Operating Procedure (SOP) History Database 606 and Operator Log Database 610. It would be understood that control system 602 as well as each of the control system components 602 to 610 may be implemented based on one or more processors.

In the illustrated embodiment, PIMS 608 is a repository of plant/process related information, while Operator Log Database 610 is a repository of operator logs generated by the control system.

CSP Monitor 604 monitors execution of control system processes and records execution data corresponding to said control system processes into CSP History database 606. Information monitored and recorded by CSP Monitor 604 includes one or more of (i) identifiers and descriptions of steps that have been added to or eliminated from a standard operating procedure (ii) identifier(s) of operator(s) responsible for the addition or elimination (iii) timestamp(s) corresponding to said additions or eliminations (iv) start time and end time of a control system process under consideration, and (v) lists of users/operators that executed the control system process.

CSP Monitor 604 and CSP History Database 606 are both communicably coupled with KPI Monitor 612. KPI Monitor 612 is configured to monitor/record KPI values corresponding to each iteration of each control system process. KPI Monitor 612 may be configured to monitor and record any or all KPI values associated with the process control system, including the KPI values discussed previously in this written description.

KPI Monitor 612 and CSP History Database 606 are simultaneously communicably coupled with Standard Operating Procedure (SOP) Performance Analyzer 614—which may be configured for one or more of (i) ranking various iterations of one or more control system processes (ii) displaying information relating to KPI values corresponding to various iterations of control system processes, KPI trends, deviations from KPI values associated with standard operating procedures, and the impact or significance of such deviations (iii) raising alerts or alarms in accordance with the various method steps described previously in this written description, and (iv) updating, modifying, or replacing existing standard operating procedures in accordance with any of the method steps described previously in this written description.

FIG. 7 illustrates an exemplary computing system in which various embodiments of the invention may be implemented.

The system 702 comprises at least one processor 704 and at least one memory 706. The processor 704 executes program instructions and may be a real processor. The processor 704 may also be a virtual processor. The computer system 702 is not intended to suggest any limitation as to scope of use or functionality of described embodiments. For example, the computer system 702 may include, but not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 702 in accordance with the present invention may include one or more servers, desktops, laptops, tablets, smart phones, mobile phones, mobile communication devices, tablets, phablets and personal digital assistants. In an embodiment of the present invention, the memory 706 may store software for implementing various embodiments of the present invention. The computer system 702 may have additional components. For example, the computer system 702 includes one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702 using processor 704, and manages different functionalities of the components of computer system 702.

The communication channel(s) 708 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 710 may include, but is not limited to, a touch screen, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not limited to, a user interface on CRT, LCD, LED display, or any other display associated with any of servers, desktops, laptops, tablets, smart phones, mobile phones, mobile communication devices, phablets, personal digital assistants, printer, speaker, CD/DVD writer, or any other device that provides output from the computer system 702.

The storage 714 may include, but is not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 702. In various embodiments of the present invention, the storage 714 contains program instructions for implementing the described embodiments.

In an embodiment of the present invention, the computer system 702 is part of a distributed network.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 702. The method described herein is typically implemented as a computer program product, comprising a set of program instructions which is executed by the computer system 702 or any other similar device. The set of program instructions may be a series of computer readable codes stored on a tangible medium, such as a computer readable storage medium, for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, bluetooth or other transmission techniques. These instructions can be pre-loaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for optimizing standard operating procedures for an industrial automation process control system having a plurality of field devices, including at least one of actuators and sensors, the method comprising:
    recording a sequence of control system operator actions, wherein one or more operator actions within the recorded sequence of control system operator actions are detected based on at least one operator input received at a processor implemented operator interface;
    identifying a control system process corresponding to the recorded sequence of control system operator actions;
    determining a set of key performance indicator values (KPI values) associated with the recorded sequence of control system operator actions, wherein one or more KPI values within the determined set of KPI values are determined based on state changes detected at said plurality of field devices;
    retrieving a standard operating procedure associated with the identified control system process, wherein said standard operating procedure defines a sequence of control system operator actions;
    retrieving a set of KPI values associated with the standard operating procedure;
    determining a first set of deviations between (a) the recorded sequence of control system operator actions and (b) the sequence of control system operator actions defined by the standard operating procedure;
    determining a second set of deviations between (c) the set of KPI values associated with the recorded sequence of control system operator actions and (d) the set of KPI values associated with the standard operating procedure; and
    responsive to one or both of the first set of deviations and second set of deviations conforming to a predefined modification criteria, modifying the standard operating procedure to reduce deviation between (e) the recorded sequence of control system operator actions and (f) control system operator actions defined by said standard operating procedure,
    wherein modifying the standard operating procedure comprises replacing said standard operating procedure with the recorded sequence of control system operator actions.

2. The method as claimed in claim 1, wherein modifying the standard operating procedure comprises one of:
    adding to the control system operator actions defined by said standard operating procedure, at least one control system operator action that is included within the recorded sequence of control system operator actions; or
    removing from the control system operator actions defined by said standard operating procedure, at least one control system operator action that is excluded from the recorded sequence of control system operator actions.

3. The method as claimed in claim 1, wherein determining conformity with the predefined modification criteria comprises determining one or more of:
    existence of one or more differences between (f) the recorded sequence of control system operator actions and (g) the sequence of control system operator actions defined by the standard operating procedure; and
    existence of one or more differences between (c) the set of KPI values associated with the recorded sequence of control system operator actions and (d) the set of KPI values associated with the standard operating procedure.

4. The method as claimed in claim 3, wherein a data record corresponding to the standard operating procedure is modified responsive to a determination that:
    (h) the sequence of recorded control system operator actions eliminates one or more control system operator actions defined by the standard operating procedure, and (i) a comparison between (1) the set of KPI values associated with the recorded sequence of control system operator actions, and (2) the set of KPI values associated with the standard operating procedure, establishes an equivalence between the compared KPI values; or
    (j) the sequence of recorded control system operator actions implements one or more control system operator actions that are not included within the standard operating procedure, and (k) the set of KPI values associated with the recorded sequence of control system operator actions is closer to a target set of KPI values than the set of KPI values associated with the standard operating procedure.

5. The method as claimed in claim 1, further comprising communicating an operator alert to the processor implemented operator interface, wherein the operator alert is generated responsive to a determination that one or both of the first set of deviations and second set of deviations conform to the predefined modification criteria.

6. The method as claimed in claim 1, wherein the recorded sequence of control system operator actions is selected from among a plurality of recorded sequences of control system operator actions associated with the control system process.

7. The method as claimed in claim 6, wherein the plurality of recorded sequences of control system operator actions are ranked relative to each other, and wherein rankings of each of the plurality of recorded sequences of control system operator actions are based on a defined ranking criteria.

8. The method as claimed in claim 7, wherein selection of the recorded sequence of control system operator actions from among the plurality of recorded sequences of control system operator actions associated with the control system process comprises:
   displaying rankings of each of the plurality of recorded sequences of control system operator actions at the processor implemented operator interface; and
   receiving at the processor implemented operator interface, at least one operator input identifying a recorded sequence of control system operator actions for selection.

9. A system for optimizing standard operating procedures for an industrial automation process control system comprising one or more processors, and a plurality of field devices, including at least one of sensors and actuators, the system comprising:
   a processor implemented operator interface;
   a control system process monitor configured to:
   record a sequence of control system operator actions, wherein one or more operator actions within the recorded sequence of control system operator actions are detected based on at least one operator input received at the processor implemented operator interface;
   identify a control system process corresponding to the recorded sequence of control system operator actions; and
   retrieve a standard operating procedure associated with the identified control system process, wherein said standard operating procedure defines a sequence of control system operator actions;
   a key performance indicator monitor configured to:
   determine a set of key performance indicator values (KPI values) associated with the recorded sequence of control system operator actions, wherein one or more KPI values within the determined set of KPI values are determined based on state changes detected at the plurality of field devices; and
   retrieve a set of KPI values associated with the standard operating procedure;
   a performance analyser configured to determine a first set of deviations between (a) the recorded sequence of control system operator actions and (b) the sequence of control system operator actions defined by the standard operating procedure;
   determine a second set of deviations between (c) the set of KPI values associated with the recorded sequence of control system operator actions and (d) the set of KPI values associated with the standard operating procedure; and
   responsive to one or both of the first set of deviations and second set of deviations conforming to a predefined modification criteria, modifying the standard operating procedure to reduce deviation between (e) the recorded sequence of control system operator actions and (f) control system operator actions defined by said standard operating procedure,
   wherein modifying the standard operating procedure comprises replacing said standard operating procedure with the recorded sequence of control system operator actions.

10. The system as claimed in claim 9, wherein modifying the standard operating procedure comprises one of:
   adding to the control system operator actions defined by said standard operating procedure, at least one control system operator action that is included within the recorded sequence of control system operator actions; or
   removing from the control system operator actions defined by said standard operating procedure, at least one control system operator action that is excluded from the recorded sequence of control system operator actions.

11. The system as claimed in claim 9, wherein determining conformity with the predefined modification criteria comprises determining one or more of:
   existence of one or more differences between (f) the recorded sequence of control system operator actions and (g) the sequence of control system operator actions defined by the standard operating procedure; and
   existence of one or more differences between (c) the set of KPI values associated with the recorded sequence of control system operator actions and (d) the set of KPI values associated with the standard operating procedure.

12. The system as claimed in claim 11, wherein a data record corresponding to the standard operating procedure is modified responsive to a determination that:
   (h) the sequence of recorded control system operator actions eliminates one or more control system operator actions defined by the standard operating procedure, and (i) a comparison between (1) the set of KPI values associated with the recorded sequence of control system operator actions, and (2) the set of KPI values associated with the standard operating procedure, establishes an equivalence between the compared KPI values; or
   (j) the sequence of recorded control system operator actions implements one or more control system operator actions that are not included within the standard operating procedure, and (k) the set of KPI values associated with the recorded sequence of control system operator actions is closer to a target set of KPI values than the set of KPI values associated with the standard operating procedure.

13. The system as claimed in claim 9, wherein the performance analyser is configured to communicate an operator alert to the processor implemented operator interface, wherein the operator alert is generated responsive to a determination that one or both of the first set of deviations and second set of deviations conform to the predefined modification criteria.

14. The system as claimed in claim 9, wherein the recorded sequence of control system operator actions is selected from among a plurality of recorded sequences of control system operator actions associated with the control system process.

15. The system as claimed in claim 14, wherein the performance analyser is configured to rank the plurality of recorded sequences of control system operator actions relative to each other, and wherein rankings of each of the plurality of recorded sequences of control system operator actions are based on a defined ranking criteria.

16. The system as claimed in claim 15, wherein selection of the recorded sequence of control system operator actions from among the plurality of recorded sequences of control system operator actions associated with the control system process comprises:
displaying rankings of each of the plurality of recorded sequences of control system operator actions at the processor implemented operator interface; and
receiving at the processor implemented operator interface, at least one operator input identifying a recorded sequence of control system operator actions for selection.

17. A computer program product for optimizing standard operating procedures for an industrial automation process control system having a plurality of field devices, including at least one of actuators and sensors, comprising a non-transitory computer usable medium having a computer readable program code embodied therein, the computer readable program code comprising instructions for:
recording a sequence of control system operator actions, wherein one or more operator actions within the recorded sequence of control system operator actions are detected based on at least one operator input received at a processor implemented operator interface;
identifying a control system process corresponding to the recorded sequence of control system operator actions;
determining a set of key performance indicator values (KPI values) associated with the recorded sequence of control system operator actions, wherein one or more values within the determined set of KPI values are determined based on state changes detected at said plurality of field devices;
retrieving a standard operating procedure associated with the identified control system process, wherein said standard operating procedure defines a sequence of control system operator actions;
retrieving a set of KPI values associated with the standard operating procedure;
determining a first set of deviations between (a) the recorded sequence of control system operator actions and (b) the sequence of control system operator actions defined by the standard operating procedure;
determining a second set of deviations between (c) the set of KPI values associated with the recorded sequence of control system operator actions and (d) the set of KPI values associated with the standard operating procedure; and
responsive to one or both of the first set of deviations and second set of deviations conforming to a predefined modification criteria, modifying the standard operating procedure to reduce deviation between (e) the recorded sequence of control system operator actions and (f) control system operator actions defined by said standard operating procedure,
wherein modifying the standard operating procedure comprises replacing said standard operating procedure with the recorded sequence of control system operator actions.

* * * * *